United States Patent [19]
Karlock

[11] Patent Number: 5,410,364
[45] Date of Patent: Apr. 25, 1995

[54] METHOD AND APPARATUS FOR REMOVING AGC PULSES AND OTHER UNDESIRABLE SIGNALS FROM A VIDEO SIGNAL

[76] Inventor: James A. Karlock, 3311 NE. 35th Ave., Portland, Oreg. 97212

[21] Appl. No.: 821,766

[22] Filed: Jan. 15, 1992

[51] Int. Cl.[6] ............................................. H04N 5/52
[52] U.S. Cl. ................................. 348/683; 348/682; 348/678
[58] Field of Search ............... 358/174, 176, 177, 167, 358/36, 171, 335, 310; H04N 5/52; 348/678, 682, 683

[56] References Cited
U.S. PATENT DOCUMENTS 2,303,968  12/1942  White ............................. 178/7.1
3,479,683  9/1976  Ikeda ............................ 358/177 X
3,555,182  9/1976  Griepentrog ................... 358/177 X
3,980,816  9/1976  Niimura ........................... 358/177
4,695,901  9/1987  Ryan .............................. 358/335
5,130,810  7/1912  Ryan .............................. 358/335
5,194,965  3/1993  Quan et al. .................. 358/310 X

FOREIGN PATENT DOCUMENTS 0046472  2/1991  Japan ......................... H04N 5/52

Primary Examiner—Victor R. Kostak
Attorney, Agent, or Firm—Dellett and Walters

[57] ABSTRACT

AGC pulses and other undesirable signals are removed from a video signal by generating a replica of the AGC pulses or other signals and then mixing the replica with the original video to effect their removal.

24 Claims, 8 Drawing Sheets

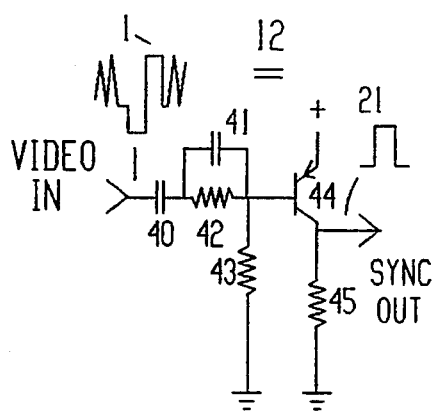
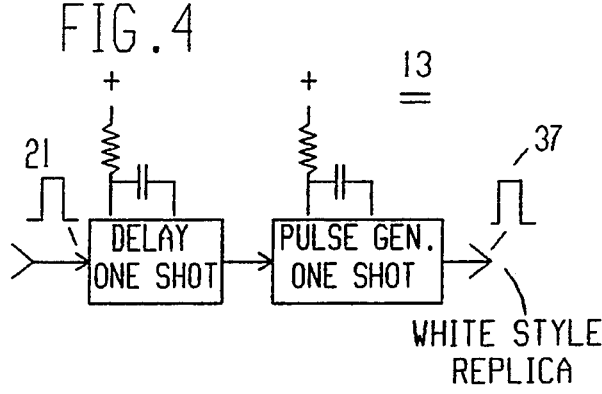
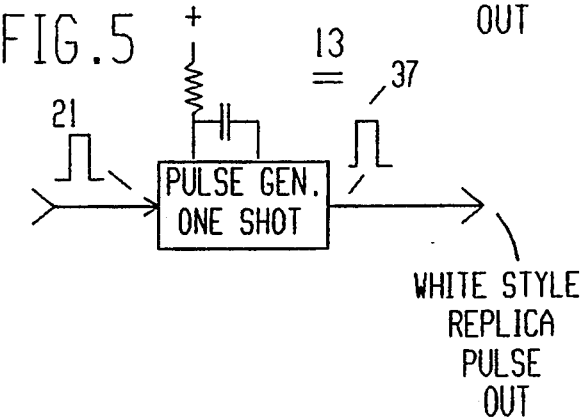
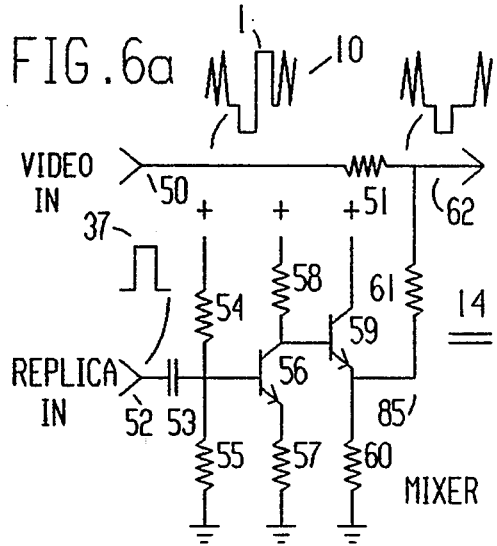
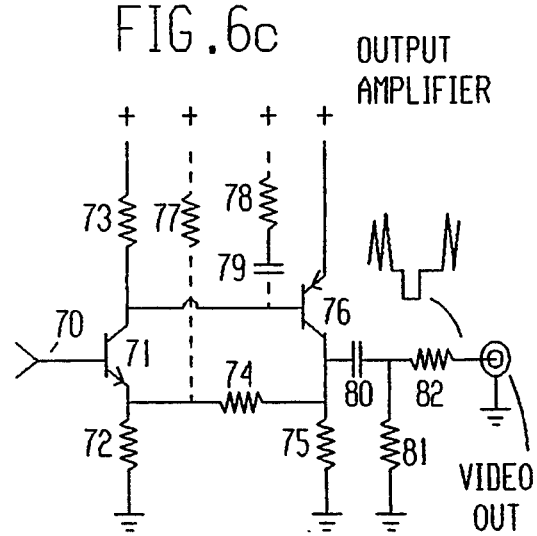
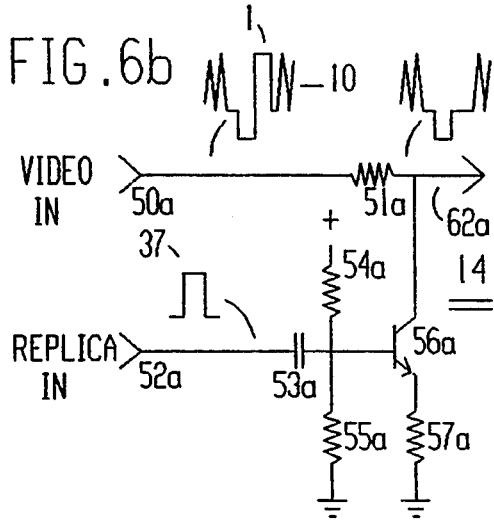

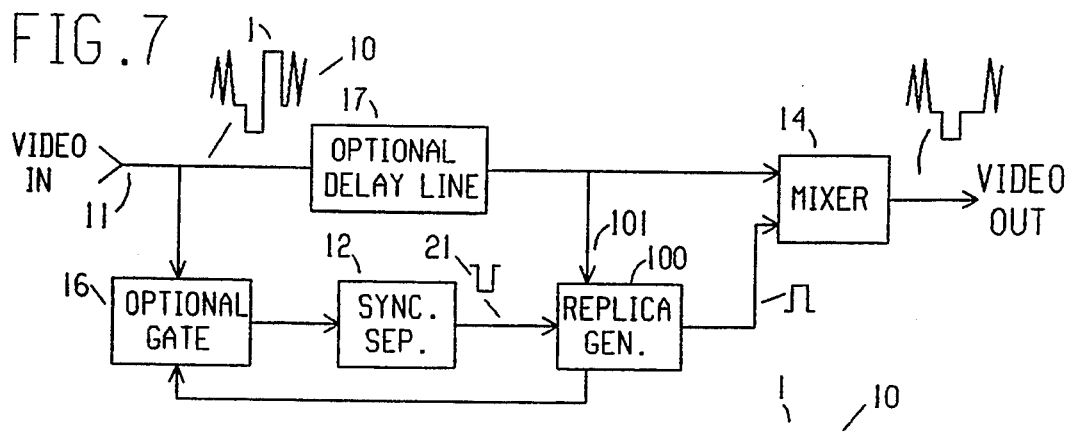
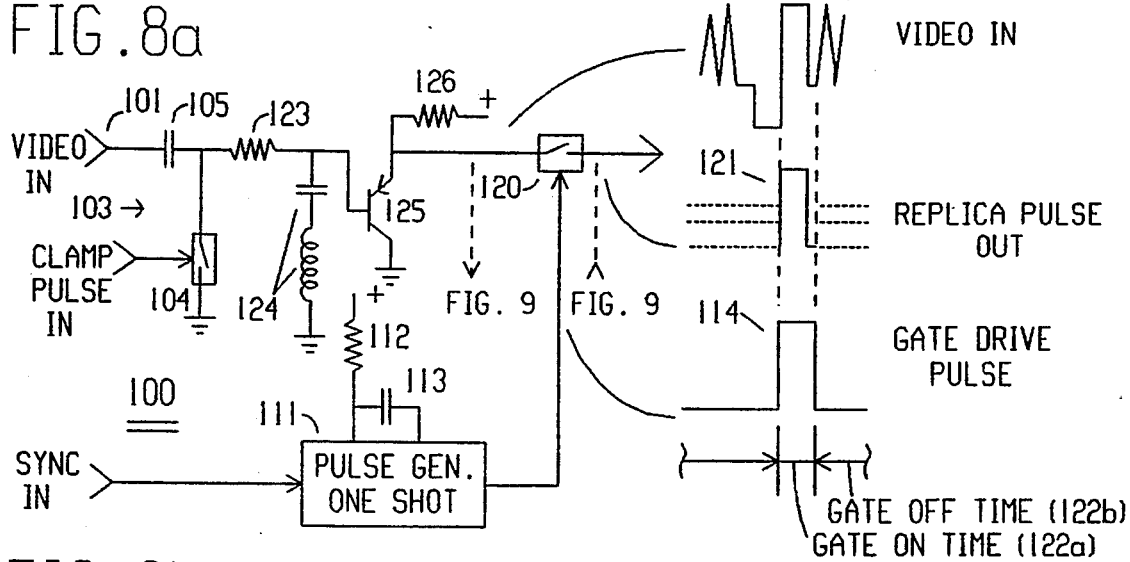
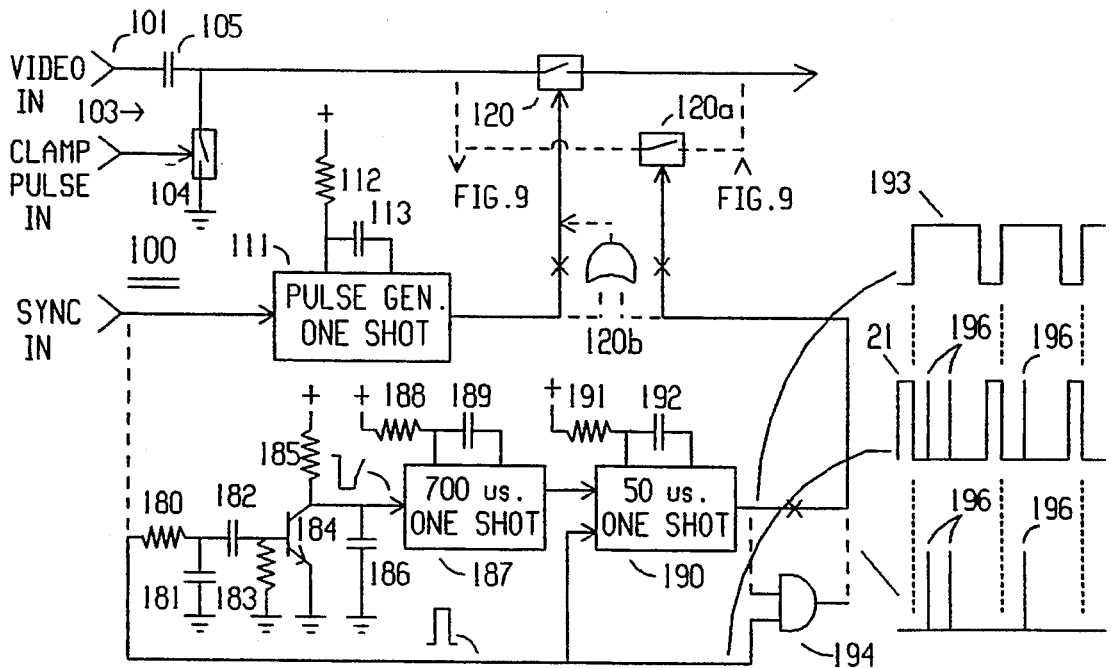

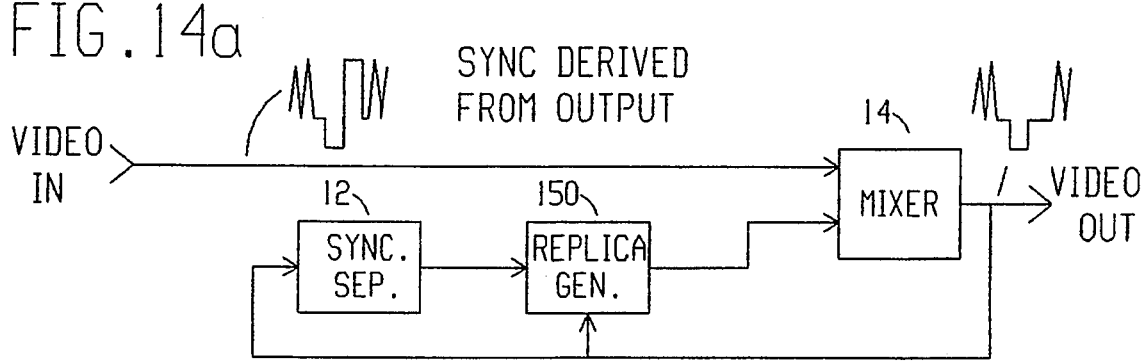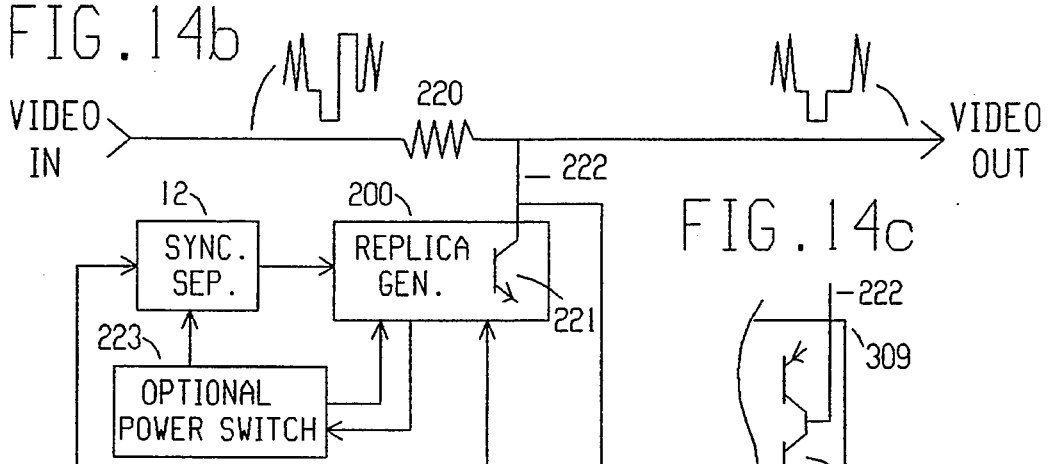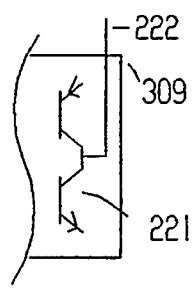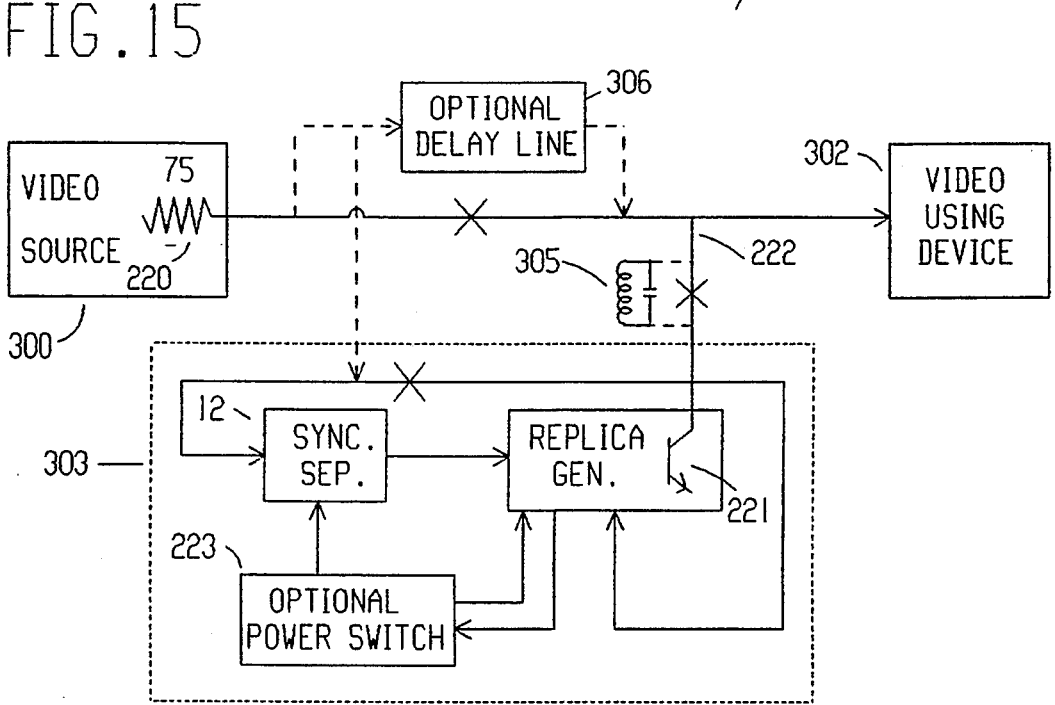

METHOD AND APPARATUS FOR REMOVING AGC PULSES AND OTHER UNDESIRABLE SIGNALS FROM A VIDEO SIGNAL

BACKGROUND OF THE INVENTION

U.S. Pat. No. 2,303,968, issued to E. L. C. White on Dec. 1, 1942, discloses a method and apparatus for the removal of pulses which were added tea video signal for the purpose of controlling an automatic gain control. These automatic gain control (AGC) pulses were removed "[i]n order to eliminate at the receiver undesirable effects due to the pulses . . . " (page 1, left column, line 41).

In general, White removed these AGC pulses ". . . by mixing them with the line synchronizing signals which are separated, delayed and/or broadened for this purpose" (Ibid. line 45). He used a delay line to delay the synchronizing pulses and, optionally, a multi-input diode OR gate connected to taps on the delay line to broaden the pulses. An inverting stage and a mixing stage, which mixed the locally generated pulses "in the negative sense" with the input video, completed his circuit.

While White's original arrangement can be implemented with modern semiconductors, certain deficiencies are present. First, use of a mixing circuit requires that the locally generated pulse amplitude precisely matches the pulse amplitude on the incoming video. If resistive mixing is used, then exact matching of pulse duration and location is also critical. Any mismatch will result in some residual pulse or part thereof at the output. Second, the delay line provides only discrete steps in pulse delay and/or pulse broadening. Third, should a pulse be absent from the input video, his circuit will add a large negative going pulse in its place which would interfere with the synchronization signals.

SUMMARY OF THE INVENTION

By applying modern semiconductors, White's circuit can be made simpler and more reliable, while a moderate increase in complexity can overcome its shortcomings.

A first object of the present invention is to have the locally generated pulses automatically match those contained in the input video for amplitude, position and duration.

A second object of the present invention is to provide an arrangement that will not have undesirable side effects if the input video is missing some, or is completely free of, added pulses.

The foregoing objects may be achieved by generating a truly precise replica of the original AGC pulse in place of White's simple approximation. This can be achieved by using White's technique of delaying and broadening the sync to generate a new pulse, but additionally processing the pulse in combination with the incoming video such that a precise replica of the pulse on the incoming video is generated. Like White, this pulse is applied to a mixing circuit which removes the pulse from the incoming video. Connecting the input to the output of the mixer optionally provides negative feedback.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIG. 3 shows a synchronizing signal separator suitable for use with both the White circuit and the present invention, FIG. 4 shows a modern replacement for White's original pulse generator, FIG. 5 shows a second modern replacement for White's original pulse generator, FIG. 6a shows a mixing circuit suitable for use in both the White circuit and the present invention, FIG. 6b shows a second mixing circuit suitable for use in both the White circuit and the present invention, FIG. 6c shows a video output stage suitable for use in both the White circuit and the present invention, FIG. 7 is a block diagram of a first embodiment of the present invention, FIG. 8a is a schematic of a replica generator according to the present invention, FIG. 8b is a schematic of a second replica generator according to the present invention, FIG. 14a is a block diagram of a modification to the second embodiment of the present invention, FIG. 14b is a block diagram of a second modification to the second embodiment of the present invention, FIG. 14c is an optional push-pull output stage for the replica generator of the second embodiment of the present invention, FIG. 15 is a block diagram of a further modification of the second embodiment of the present invention.

DESCRIPTION OF THE PRIOR ART

White described his apparatus as being for removing pulses that had been added to a video signal. These AGC pulses were added immediately following sync pulses and were for the purpose of controlling an automatic gain control which was used when a video signal was transmitted over a radio-frequency link such as from aircraft to ground. Since these pulses caused interference with normal viewing, they were removed by the apparatus described in his U.S. Pat. No. 2,303,968.

Figure 1:
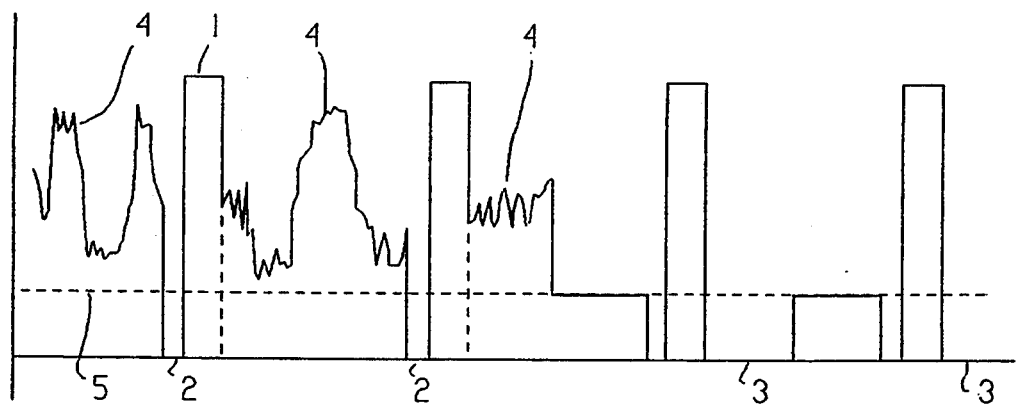
FIG. 1 is a reproduction of White's original video signal applied to the input of his apparatus.

FIG. 1, reproduced from the White patent, shows White's AGC pulses labeled 1, while horizontal sync pulses are labeled 2, vertical sync pulses are labeled 3 and picture information is labeled 4.

Figure 2:
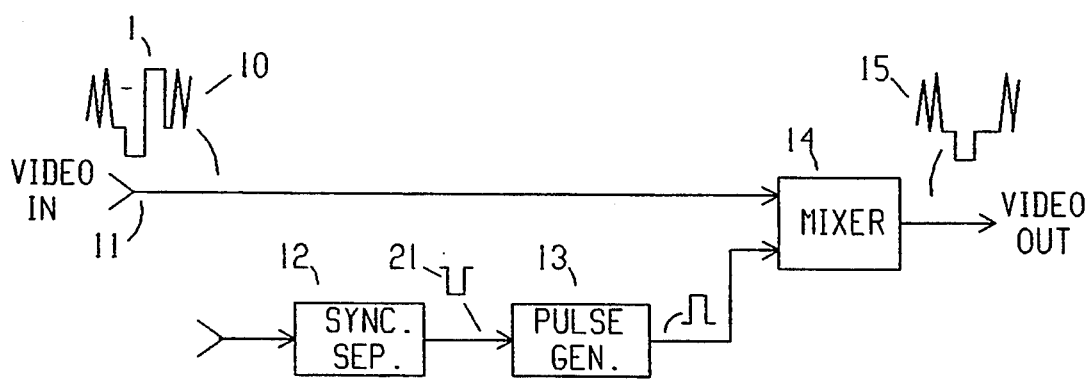
FIG. 2 shows a block diagram of White's circuit.

FIG. 2 is a block diagram of White's original circuit. Video 10 with AGC pulses 1 is received at 11 and applied to both a sync separator 12 and mixing circuit 14.

White calls this a mixing circuit but specifies that it mixes "in the negative sense" (page 2, right column, line 3). Pulse generator 13 provides a pulse that matches the AGC pulse on the incoming video for application to the mixer 14, which in turn outputs a video signal 15 free of AGC pulses.

FIG. 3 shows a conventional sync separator suitable for supplying separated sync to the above described circuit as well as to the below described improved circuits.

FIGS. 4 and 5 show two well known pulse generators, with characteristics similar to the White circuit, implemented with "off the shelf" integrated circuit one-shot multivibrators. A first one-shot multivibrator is triggered by the leading edge of separated sync 21 and provides a pulse which ends at the desired starting point of the output pulse 37. A second multivibrator is triggered at the end of this first pulse and provides an output pulse 37 of the desired duration. FIG. 5 shows a second well known pulse generator which can be used in that case where the desired pulse starts just after the end of the sync pulse. It is triggered at the end of each sync pulse 21 and provides an output pulse 37 of the desired width.

FIG. 6a shows one form of mixer circuit which provides cancellation of pulses by applying opposite polarity, equal voltage pulses to the two inputs of a resistive summer made up of mixing resistors 51 and 61. Video is received at 50 for application to one end of mixing resistor 51 and a pulse received at 52 is coupled through capacitor 53 to inverting transistor 56 which is biased by resistors 54 and 55. Emitter resistor 57 is made equal to collector resistor 58 for unity gain. Emitter follower 59 and its load resistor 60 provide a low impedance drive to resistor 61 which, in combination with resistor 51, forms a resistive mixing circuit that mixes the input video with the inverted pulse for a net result of subtraction, or as White described it, the two signals are "mixed in the negative sense". If resistor pairs 51, 61 and 57, 58 are equal and if video containing AGC pulses is applied to 50 while locally generated pulses of exactly the same amplitude, position and duration are applied to 52, the output at 62 will be video without AGC pulses. In those cases where it is desired to only reduce the amplitude of the AGC pulses, then resistor 51 can be made smaller than, instead of equal to, resistor 61.

FIG. 6b shows another form of mixer which relies on current summing. Video is received at terminal 50a for application to one end of mixing resistor 51a while a pulse is received at terminal 52a for application to the base of transistor 56a through coupling capacitor 53a. Resistor 57a sets the output pulse current at the collector of transistor 56a while resistors 54a and 55a set the bias current through transistor 56a and hence the static voltage drop across resistor 51a. Any pulse applied to 52a will provide a pulsed current through transistor 56a and hence through summing resistor 51a with a resulting pulsed voltage drop that depends on the algebraic sum of the currents that result from the signals applied to 50a and 52a. If resistor 57a is made equal to resistor 51a, then any pulse applied equally to both inputs 50a and 52a will cancel at the output 62a. In practice, video containing a given amplitude of pulse is applied to terminal 50a while an exactly matching pulse is applied to 52a with the result that video with no pulse appears at the output 62a. Again, if it is desired to reduce the amplitude of the AGC pulses instead of entirely removing them, then resistor 51a can be made smaller than resistor 57a.

FIG. 6c shows a suitable amplifier for driving a standard 75 ohm line. It is of standard design with resistors 74 and 72 setting the gain while resistor 73 sets the bias current in transistor 71. Resistor 75 is chosen to properly drive the load which is coupled through capacitor 80 and source termination resistor 82 which is usually 75 ohms. Optional resistor 77 shifts the static DC potential at the output while resistor 78 and capacitor 79 provide phase correction and roll-off to prevent oscillation. Resistor 81 keeps the output side of capacitor 80 at ground potential if the output is left open.

DETAILED DESCRIPTION OF THE PRESENT INVENTION

The mixing circuit has the requirement that the locally generated AGC pulse must precisely match the AGC pulse contained in the input video for three parameters: amplitude, width and position. White created an approximation of the inputted AGC pulse with the above described delay line, OR gate and limiter. A better method of creating the required pulse is to isolate and process the actual inputted AGC pulse so as to create a true replica, then apply it to the mixer so that it, in effect, cancels itself.

FIG. 7 shows a block diagram of a first embodiment of the present invention which is similar to White's except that replica pulse generator 100 receives video at a second input 101. Optional delay line 17 can provide a video delay so as to compensate for the finite delay in sync separator 12 if the AGC pulses immediately follow sync pulses while optional gate 16 can inhibit the video input to the sync separator during certain times if such times are expected to contain signals that might disturb the sync separator. The improved pulse generator (replica pulse generator) may be implemented as shown in FIGS. 8a or 8b with FIGS. 9 and 10 being optional improvements that can be added to FIGS. 8a or 8b.

FIG. 8a receives video at the input of optional clamp 103 which is made up of switch 104 and capacitor 105. A chroma reject circuit made up of resistor 123, series chroma trap 124, emitter follower 125 and load resistor 126 provides a chroma free, low impedance drive to switch 120. Separated sync is received at the trigger input of one-shot multivibrator 111 which supplies a pulse 114 in response to the trailing edge of the applied sync. The pulse 114, like White's, is set to begin before, and end after, the AGC pulse 1 contained in video 10 which is applied to the signal input of switch 120. In response to pulse 114, switch 120 outputs replica pulse 121 which can be applied to the mixer 14 of FIG. 7. If it is desired to remove the color burst, or if color burst is not expected to be present in the input video, the above described color trap may be omitted so as to allow color burst cancellation by the same means that the AGC pulses are canceled. Similarly, if the input video is expected to not have any tilt or other such low frequency problems, then clamp 103 need not be included.

The above described replica pulse 121 is clearly determined only during the gate on time 122a and floating during those times 122b when the gate is off. This may be corrected by the below described circuit shown in FIG. 9 if desired. If pulse 114 is much wider than the expected AGC pulse, it may cause part of the video (or any other) signal that follows to be applied to the mixer and therefore removed from the outputted video signal.

Figure 10:
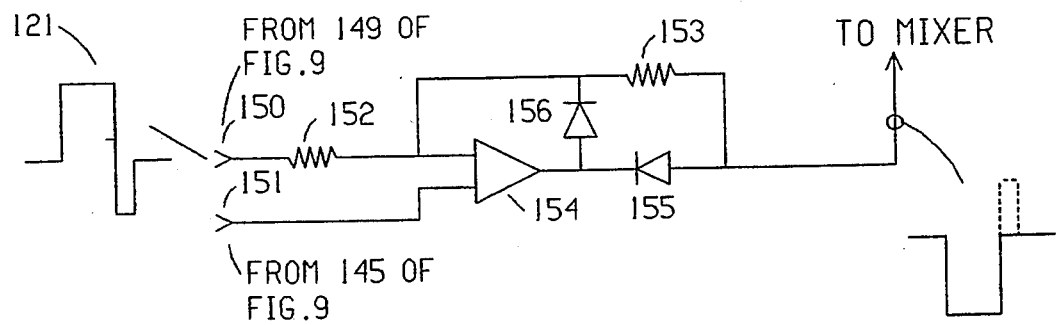
FIG. 10 is a schematic of an additional circuit that can be used with the improved pulse generator.

Although such removal is often desirable, it can be prevented by removing such signals with an optional rectifier, such as that shown in FIG. 10, which will pass (or select) only positive signals.

FIG. 8b shows how this characteristic may be exploited by creating a pulse 193 similar to 114 but of width almost equal to the entire time between two adjacent horizontal sync pulses (i.e., about 55 μs) in order to blank most of this intersync time or to provide negative signal removal during this time. Resistor 180 and capacitor 181 integrate the separated sync to provide a positive pulse in response to vertical sync which is then coupled to transistor 184 by capacitor 182. Resistor 183 is chosen so that transistor 184 conducts only on the positive peaks of the integrated sync and thus its collector provides a negative pulse beginning at the start of the vertical sync and ending at a time set by the charging time of capacitor 186 and resistor 185. The rising edge of this pulse, which is delayed a few lines after the end of vertical sync, triggers one-shot multivibrator 187 which outputs a pulse lasting until approximately the end of the vertical blanking interval under the control of the time constant set by capacitor 189 and resistor 188. This vertical back porch pulse serves as an enable to one-shot multivibrator 190 by being applied to its reset input such that the reset is removed for the duration of the pulse. One shot multivibrator 190 is triggered by the trailing edge of horizontal sync, thus outputting a series of pulses 193, each of which starts at the end of a horizontal sync pulse 21 and ends just before the next horizontal sync pulse. This series of pulses occurs once per field during the back porch region of the vertical blanking interval and can be used to blank said region of the video signal by applying it to a second switch 120a which outputs a replica signal, corresponding to any signal that may be present during those times that pulses 193 are active, for application to the mixer. Of course, OR gate 120b can be added instead of switch 120a. Additionally, if stray negative noise pulses are expected in this region of the video signal, this series of pulses can be used to open a gate (i.e., 16 of FIG. 7) such that the sync separator is not disturbed by them. Although it is frequently desirable to remove both negative and positive going signals, the additional circuitry of FIG. 8b can be restricted to removing only unwanted negative pulses by using AND gate 194 to gate the series of pulses with separated sync 21 (which will contain the unwanted negative pulses in inverted form 196), so as to provide output pulses only during the occurrence of stray input pulses 196, before application to switch 120a. This arrangement is advantageous under circumstances where it is desired to leave any test signals, closed captions and the like that may be present in the vertical interval while removing unwanted negative pulses. Since the sync separator must output these unwanted pulses, the gate 16 of FIG. 7 cannot be used in this variant. Additionally, a chroma trap as described with respect to FIG. 8a would normally be included at the corresponding point in FIG. 8b.

Another option is to provide a negative signal selector similar to the positive signal selector of FIG. 10 between gate 120a and mixer 14, so as to restrict the removal to negative signals. In fact, by applying various combinations of the herein disclosed techniques, one can blank any selected portion, portions or even all of the video signal. If one-shot multipvibrator or pulse generator 111 is replaced by a source of standard composite blanking, and no signal selector is used, then an ordinary video blanking operation will result, i.e., all sync and other signals of any kind will be removed from all of the non-picture regions of the video signal (usually in preparation for the addition of new synchronizing signals).

Figure 9:
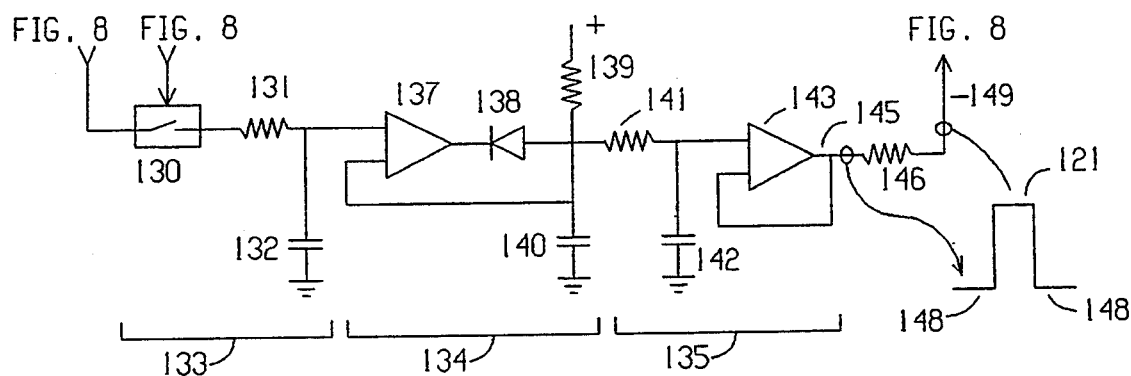
FIG. 9 is a schematic of additional circuitry to improve the pulse generators of FIGS. 8a and 8b.

FIG. 9 shows one circuit that will provide a clearly determined voltage level during the gate off time 122a of FIG. 8a. Such a reference voltage is desirable since otherwise the replica pulses applied to the mixer 14 may not have the proper amplitude, resulting in incomplete cancellation or cancellation of part of the underlying video signal. Sample and hold circuit 133 samples the blanking reference voltage of the input video for application to the negative peak detector 134 which holds the most negative blanking reference so as to reject any AGC pulses that may be present on the incoming video. Filter 135 provides a slow overall response time to reject any noise or extraneous samples. The voltage at the output 145 of the filter 135 is equal to the blanking reference level of the video signal and thus is the voltage 148 that should be present when replica pulse 121 is not present due to the switch 120 being open (or off). Although this replica pulse is suitable for application to the previously described mixers, it will also contain negative elements if they should be present during the on time of gate 120 and such negative elements would also be canceled out of the video signal.

FIG. 10 shows a well known half wave rectifier that may be placed after the circuit of FIG. 9 if it is desired to select only positive signals for outputting to mixer 14. Reference input 151 receives the blanking level reference level 148 from point 145 in FIG. 9 while 150 receives replica pulse 121 from FIG. 9. Any signal that is positive with respect to the reference level 148 will be passed to the output in inverted form, while any negative signals will be ignored. The output of FIG. 10 is suitable for application to the mixer shown in FIG. 6a at the point 85. In such a case, the inverting amplifier formed by transistors 56 and 59 is not used.

Figure 11:
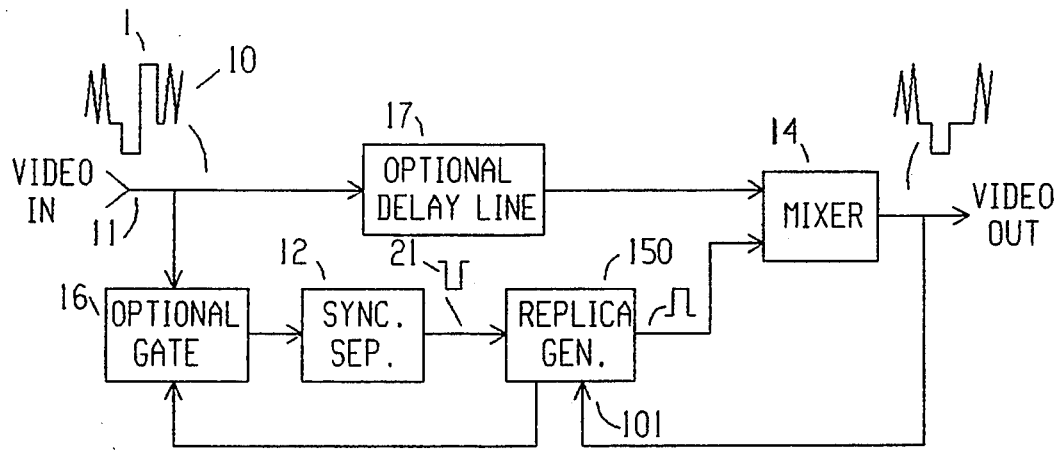
FIG. 11 is a block diagram of a second embodiment of the present invention.

FIG. 11 shows the block diagram of a second embodiment of the improved apparatus. This is similar to FIG. 7 except that negative feedback is created by driving the input to replica pulse generator 150 from the output of the mixer 14 instead of the inputted video 10 yielding the advantage of not requiring the blanking reference circuit of FIG. 9.

Figure 12:
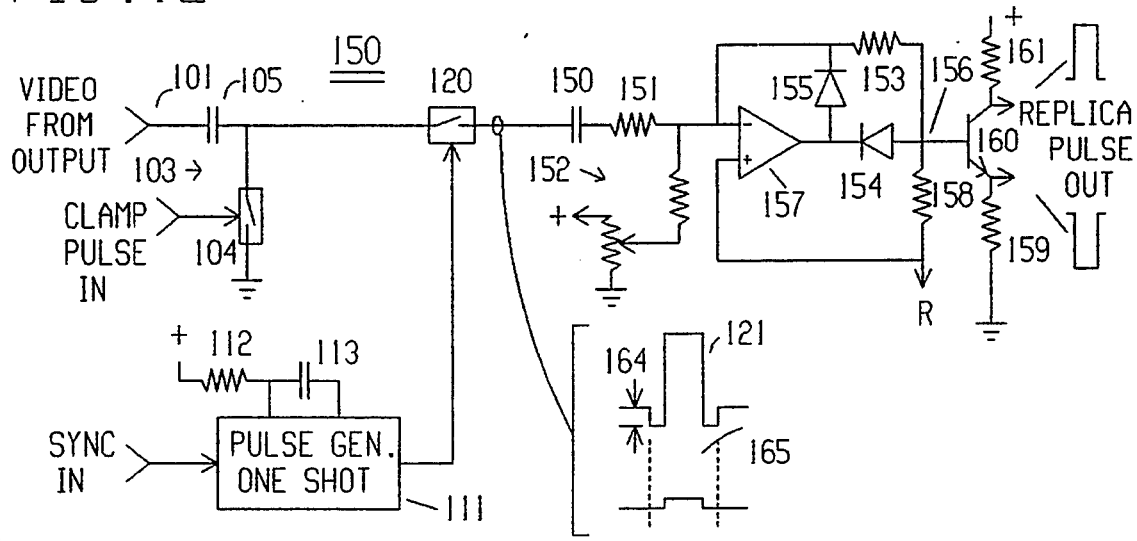
FIG. 12 is a replica generator suitable for use in the second embodiment.

FIG. 12 shows a replica pulse generator that can be used in the FIG. 11 block diagram. Video from the output of the mixer 14 is applied to video input 101, optionally through clamp 103 and optionally through a chroma trap (as in FIG. 8a above) to gate 120. The gate output is coupled to the half wave rectifier through capacitor 150 and gain setting resistor 151. Optional offset trim circuit 152, consisting of a potentiometer and resistor, allows the exact zero point to be set. Diode 154 and gain setting resistor 153 provide negative feedback during positive excursions of the input signal while diode 155 provides negative feedback during negative excursions of the input signal. The gain setting resistors are chosen for a voltage gain of about 100. It will be appreciated by one skilled in the art that the output of the rectifier at 156 will be an inverted and amplified replica of the positive portion of the input signal, i.e., a negative pulse. The overall negative feedback will adjust this pulse's amplitude, width and duration so as to cancel the AGC pulse from the output video; in this case, since the mixer is of unity gain, this pulse will be equal to the AGC pulse in amplitude, duration and position. Resistor 158, returned to a reference voltage R, provides a predetermined voltage at 156 when the input to the rectifier is negative. A unity gain inverter made up of transistor 160 and equal value resistors 159 and 161 provides positive pulses that may be applied to either of the mixers shown in FIGS. 6a or 6b. Alternatively, the negative pulse output of the just described rectifier or the emitter output of transistor 160 may be applied directly to point 85 in FIG. 6a, thus eliminating transistors 56, 59 and their associated circuitry.

Replica pulse 121 would normally have an undetermined voltage offset 164 when the gate is open if compensation as was done in FIG. 9 were omitted, but in this case negative feedback drives the pulse to a small residual 165 which is not large enough to cause a significant error.

Figure 13:
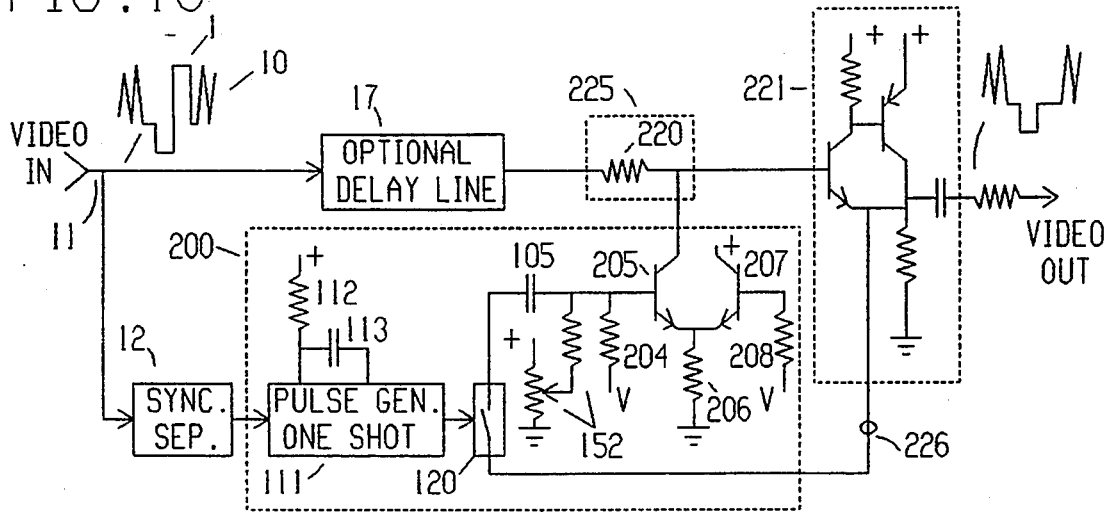
FIG. 13 is a schematic of one example of the block diagram shown in FIG. 11.

FIG. 13 discloses how the half wave rectifier may be merged with the mixer. As in the previous embodiments above, sync is applied to replica generator 200 at the input of the pulse generator 111 which generates a gate pulse for application to the gate 120 as described above. While transistors 205 and 207 may appear to form a differential pair, they are used as a half wave rectifier which outputs a current mode replica pulse. Transistor 207 provides a temperature compensated voltage at its emitter, across resistor 206, that exactly matches the base-to-emitter voltage drop inherent in transistor 205 and both bases are returned to an intermediate voltage V through resistors 204 and 208. Any positive pulse applied to the base of transistor 205 will cause it to conduct and draw a current through mixing resistor 220, and negative feedback causes this to exactly match the inputted positive pulse in width, position and amplitude (as reflected by the voltage drop across resistor 220). Any negative pulses that pass through gate 120 will be ignored by transistor 205; thus both the half wave rectifier and mixing circuits are merged into one. Optional-offset adjustment may be provided by a resistor-potentiometer combination 152 or a single resistor to ground (or the power supply) as desired. Unity gain amplifier 221 provides the required low impedance drive to a standard 75 ohm video line. If desired and as described in conjunction with the above circuits, a chroma trap and/or clamp may be included in this arrangement at point 226. A video delay line 17 may be included. If it is desired to attenuate the AGC pulses instead of entirely removing them, the offset adjustment 152 can be set so that any desired amplitude of the AGC pulse remains.

FIG. 14a discloses that the input to the sync separator 12 may also be connected to the circuit output. FIG. 14b shows that, if the mixer circuit uses a current source, transistor 221, then the apparatus can be connected to the video path with a single wire 222. As will be shown, such an arrangement is capable of operating at very low power and thus is suitable for battery operation. In such a case, considerable power can be saved by reducing the static bias on the sync separator when video is not applied to the device. Block 223 accomplishes this by sensing any convenient pulse that is formed in response to the input video, such as separated sync or that supplied by one-shot multivibrator 111 of FIG. 8a, and increasing the static current through the sync separator. This is practical since, when no video is applied to the input, it is not required that the sync separator respond to sync quickly. The response may be on the order of 40–50 μs, allowing a collector resistor of several megohms. Such a resistor will draw only a few micro-amps from a battery. With video applied at the input and the circuit operating, it must respond within a few hundred nano-seconds, thus requiring a much lower collector resistor, and more bias current, both of which are provided by power switch 223.

FIG. 14c shows an alternative replica generator 309, which can replace generator 200, containing a modified output stage which has the above mentioned NPN transistor current source 221 for removing positive pulses plus an additional PNP transistor current source for removing negative pulses. Such an arrangement also can be used to blank the video signal, drawing power only at those times that the input video deviates from ideal blanking.

FIG. 15 shows how the mixing resistor 220 may be contained within another video apparatus 300. Normally, this would be the 75 ohm source termination resistor. Apparatus 302 receives the video signal generated by video source 300 as modified by the single wire 222 connected apparatus 303. Optionally, subcarrier trap 305 will prevent the circuit from affecting color burst which is at the same time as the AGC pulses and might be riding upon same. Optional video delay line 306 may delay the video signal so as to compensate for the delay within the sync separator in which case the input to the sync separator would be connected to the input of the delay line not the single wire connected current injection point 222. While requiring two connections to the video path, this still retains the major advantage of these arrangements; the video path has no active devices which consume valuable power and thus are suitable for battery operation. Although the pulse generator 200 of FIG. 13 could be used within 303, it would be difficult to get sufficient drive for the 75 ohm mixing resistor.

Figure 16:
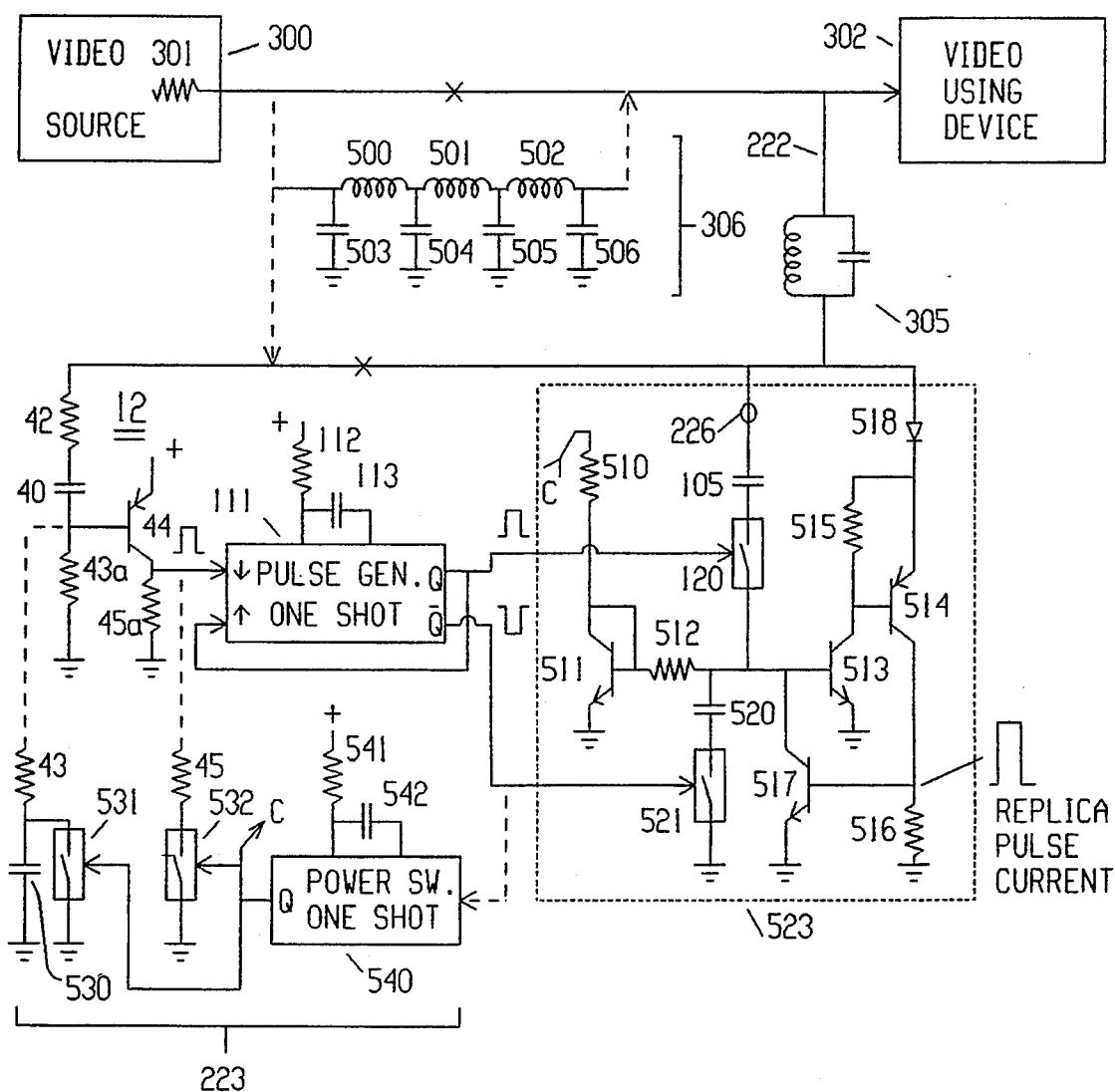
FIG. 16 is a schematic of one example of the block diagram shown in FIG. 15.

FIG. 16 shows one practical embodiment of the FIG. 15 block diagram with low enough current consumption to allow battery operation. As above, one-shot multivibrator 111 supplies pulses to operate a switch 120 which through coupling capacitor 105 provides pulses to the base of unilateral current source transistor 513 whose output current is amplified by emitter follower current amplifier 514 and its input current sensing resistor 515. Resistor 516 senses the output current, and through transistor 517 provides an over current limiter at about 50% above the maximum expected current. Switch 521 and capacitor 520 de-glitch the output of switch 120. Resistor 510 and transistor 511 provide a voltage source which matches the base-to-emitter potential of transistor 513 and thus resistor 512 biases transistor 513 at the threshold of conduction. If it is desired to remove negative going as well as positive going components from the video signal, an additional block identical to block 523 can be added, but with transistors of the opposite polarity and diode 518 reversed. If it is desired to attenuate AGC pulses instead of remove them entirely, a resistor can be inserted at point 222 or a low Q inductor can be chosen for the chroma trap 305.

It will be appreciated that if CMOS components are used for the one-shot multivibrators, and resistor 510 is supplied from the Q output of the power switch one-shot multivibrator 540 at point C, the only current drawn in the absence of video input will be by the sync separator transistor 44 which can readily be reduced by applying the teachings of my previous U.S. Pat. No. 4,870,297, the disclosure of which is hereby incorporated by reference herein. Power switch 223 receives pulses from one output of one-shot pulse generator 111 and, under the control of resistor 541 and capacitor 542, provides a multi-line duration output pulse Which is retriggered by each horizontal sync pulse received. This continuously retriggered, and therefore constant, output is used to increase the bias current on the sync separator transistor 44 by paralleling resistors 43a and 45a with lower valued resistors 43 and 45. The paralleling is conveniently done with otherwise unused sections, 531 and 532 of the same switch integrated circuit that includes switches 120 and 521, although ordinary transistors could be used instead.

Figure 17:
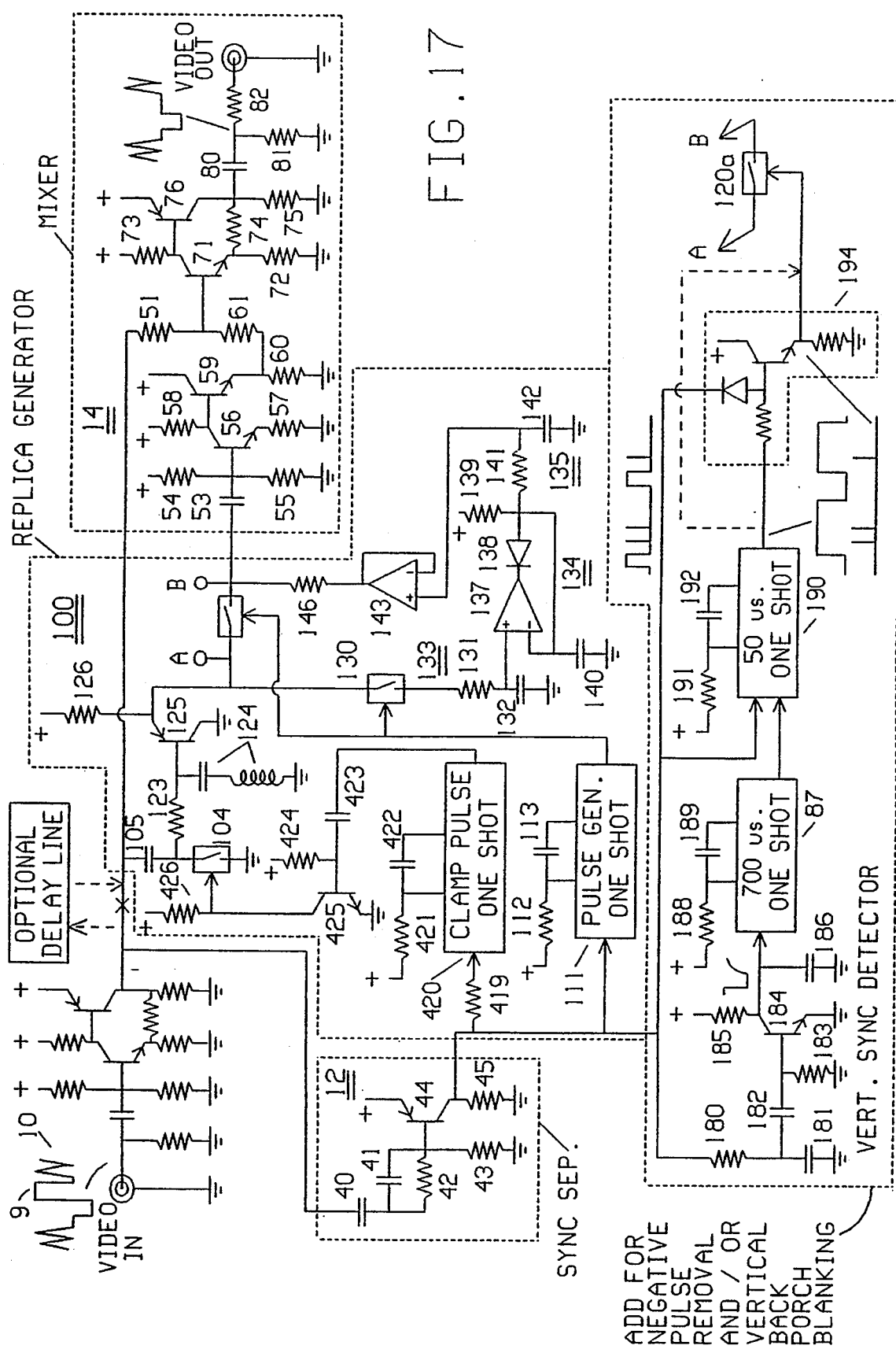
FIG. 17 is a schematic of a one example of the block diagram shown in FIG. 7.

FIG. 17 is a schematic of one implementation of the block diagram of FIG. 7 utilizing previously described blocks with an input amplifier similar to the above described output amplifier of FIG. 6c. One-shot multivibrator 420 is triggered by separated sync through delay resistor 419 and provides an output pulse width equal to about ¾ of the time between successive horizontal sync pulses so as to eliminate the double rate pulses found during the vertical sync and equalizing pulse times. The leading edge of the output pulse from 420 triggers a conventional half-shot multivibrator composed of capacitor 423, transistor 425 and resistors 424 and 426. The resultant 1 μs pulse is used to drive the above described clamp 103, in this case at the tip of sync.

It will be appreciated that the invention is not restricted to the particular embodiments that have been described, and that variations may be made therein without departing from the scope of the invention as defined in the appended claims and equivalents thereof.

I claim:

1. A method of removing AGC pulses added after sync pulses to a video signal for the purpose of controlling an automatic gain control, comprising the steps of:
   separating sync pulses;
   replicating said AGC pulses using sync and video; and
   linearly mixing said replica pulses with said video signal, so as to remove said AGC pulses from said video signal.

2. A method as in claim 1, wherein said replicating step comprises processing said input video signal through a gate circuit.

3. A method as in claim 1, wherein said mixing is done by the resistive method.

4. A method as in claim 2, wherein said replicating step includes the step of establishing a reference level for the replica pulse during those times that the gate circuit is open.

5. An apparatus for removing AGC pulses added after sync pulses to a video signal for the purpose of controlling an automatic gain control, comprising:
   a sync separator for outputting sync;
   a replica generator responsive to said sync and said video signal for generating a replica of said AGC pulses; and
   a linear mixer for summing the output replicated AGC pulses of said replica generator and said video signal in plus/minus relative relationship, so as to cancel said AGC pulses by destructive summation and provide an output video signal substantially free of AGC pulses.

6. An apparatus as in claim 5, wherein said sync separator is connected to receive video at a node before said mixer.

7. An apparatus as in claim 5, wherein said replica generator includes a gate.

8. An apparatus as in claim 5, wherein said replica generator includes a blanking reference generator.

9. A method of removing AGC pulses, following sync pulses from a video signal comprising the steps of:
   separating sync, using sync to generate a gating pulse;
   using said gating pulse to establish a conduction path from the output of a mixer to the input of a unilaterally conducting current source; and
   applying the output of said unilaterally conducting current source to an input of said mixer, so as to provide a video signal output free of AGC pulses.

10. A method as in claim 9, further comprising the step of delaying the video signal before application to said mixer.

11. A method as in claim 9, further comprising the step of delaying the video signal within the mixer.

12. A method as in claim 9, further comprising the step of amplifying the output current of said unilaterally conducting current source by a amplifying device receiving its input from said unilaterally conducting current source.

13. A method as in claim 9, further comprising the step of providing a second unilaterally conducting current source which conducts at times when the first unilaterally conducting current source is not conducting.

14. An apparatus for modifying a video signal which contains AGC pulses, after sync pulses, comprising:
   a sync separator for separating sync from a video signal;
   a replica generator connected to said video signal and said sync separator so as to provide a replica signal; and
   a mixing resistor to receive said video signal and said replica signal;
   whereby AGC pulses are effectively removed from said video signal.

15. A method of removing AGC pulses added after sync pulses to a video signal for the purpose of controlling an automatic gain control, comprising the steps of:
   separating sync pulses;
   replicating said AGC pulses using sync and video; and
   mixing said replica pulses with said video signal, so as to remove said AGC pulses from said video signal;
   wherein said mixing is by the current summing method.

16. A method of removing AGC pulses added after sync pulses to a video signal for the purpose of controlling an automatic gain control, comprising the steps of:
   separating sync pulses;
   replicating said AGC pulses using sync and video; and
   mixing said replica pulses with said video signal, so as to remove said AGC pulses from said video signal;
   wherein said video signal is delayed before mixing.

17. A method of removing AGC pulses added after sync pulses to a video signal for the purpose of controlling an automatic gain control, comprising the steps of:
   separating sync pulses;
   replicating said AGC pulses using sync and video; and
   mixing said replica pulses with said video signal, so as to remove said AGC pulses from said video signal;
   wherein said separating sync pulses step acts upon video outputted by said mixing step.

18. An apparatus for removing AGC pulses, or other signals, added after sync pulses to a video signal for the purpose of controlling an automatic gain control, comprising:

a sync separator for outputting sync;

a replica generator responsive to said sync and said video signal for generating a replica of said AGC pulses or other signals; and a mixer for mixing the output of said replica generator and said video signal, so as to provide an output video signal free of AGC pulses;

wherein said sync separator is connected to receive video from a node after said mixer.

19. An apparatus for removing AGC pulses, or other signals, added after sync pulses to a video signal for the purpose of controlling an automatic gain control, comprising:

a sync separator for outputting sync;

a replica generator responsive to said sync and said video signal for generating a replica of said AGC pulses or other signals; and a mixer for mixing the output of said replica generator and said video signal, so as to provide an output video signal free of AGC pulses;

said apparatus further comprising a video gate so as to provide the sync separator with a video signal free of unwanted signals.

20. An apparatus for modifying a video signal which contains AGC pulses, after sync pulses, comprising:

a sync separator for separating sync from a video signal;

a replica generator connected to said video signal and said sync separator so as to provide a replica signal; and a mixing resistor to receive said video signal and said replica signal;

whereby AGC pulses are effectively removed from said video;

wherein said replica generator signal includes a unilaterally conducting device so as to provide a current mode replica of said AGC pulses.

21. An apparatus as in claim 20, wherein the output current of said unilaterally conducting device is further amplified by an amplifying device.

22. An apparatus as in claim 20, further comprising a delay line interposed between said mixing resistor and the replica generator output.

23. An apparatus as in claim 20, further comprising a second current mode replica generator for signals of the opposite polarity.

24. An apparatus for modifying a video signal which contains AGC pulses, after sync pulses, comprising:

a sync separator for separating sync from a video signal;

a replica generator connected to said video signal and said sync separator so as to provide a replica signal; and a mixing resistor to receive said video signal and said replica signal;

whereby AGC pulses are effectively removed from said video;

said apparatus further comprising a means for reducing the sync separator current during times when no video signal is received.

* * * * *